United States Patent Office 2,837,578
Patented June 3, 1958

2,837,578

CHLORO-NITRO COMPOUNDS AND THEIR PREPARATION

John F. Brown, Jr., Schenectady, N. Y., assignor to General Electric Company, a corporation of New York No Drawing. Application November 19, 1953
Serial No. 393,230

8 Claims. (Cl. 260—644)

This invention relates to a method of preparing chloro-nitro organic compounds from unsaturated organic compounds. More particularly, this invention is concerned with a method of preparing organic compounds containing chlorine atoms and nitro ($-NO_2$) groups attached to adjacent carbon atoms, which process comprises effecting reaction between (1) a hydrocarbon or substituted hydrocarbon having at least one olefinic double bond, (2) nitrocyl chloride, and (3) oxygen in the presence of catalytic amounts of oxides of nitrogen other than nitrous oxide. This invention is also concerned with compounds prepared by the above method.

In the past, a few chloro-nitro organic compounds have been prepared by adding nitryl chloride to an olefinic double bond, but this has not been found to be a convenient method of synthesis because of the difficulty of obtaining nitryl chloride and the danger of explosion during the course of reaction with an olefin.

I have now discovered that an efficient, controllable chloro-nitration of hydrocarbons and substituted hydrocarbons containing at least one olefinic double bond can be accomplished by reacting the olefin compound with nitrosyl chloride and oxygen in the presence of catalytic amounts of nitrogen dioxide. The nitrogen dioxide may be supplied to the reaction in the form of nitrogen dioxide per se or in the form of other oxides of nitrogen which are transformed to nitrogen dioxide under conditions of the reaction. The oxides of nitrogen which yield nitrogen dioxide include nitrogen trioxide, dinitrogen tetroxide, and nitrogen pentoxide, but do not include nitrous oxide.

When an attempt is made to react nitrosyl chloride, oxygen, and an olefin, it would be expected that the oxygen would oxidize the nitrosyl chloride to nitryl chloride and that the nitryl chloride would add across the olefinic double bond. I have found that this reaction takes place at only a negligible rate. Unexpectedly, I have found that when an oxide of nitrogen which supplies nitrogen dioxide is added to the reaction mixture, chloronitration of the olefin takes place at a relatively rapid rate. Although I do not wish to be bound by theoretical considerations, the following chloronitration reaction is believed to take place:

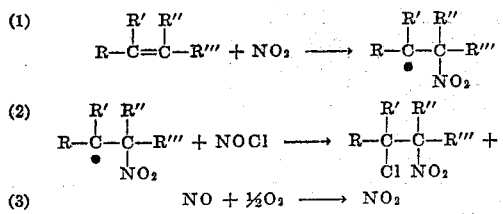

where R, R', R", and R'" are the same or different members of the group consisting of hydrogen; saturated lower aliphatic hydrocarbon radicals, e. g., methyl, ethyl, proply, isopropyl, butyl, isobutyl, etc., radicals; olefinically unsaturated lower aliphatic hydrocarbon radicals, e. g., vinyl, allyl, etc.; aryl radicals e. g., phenyl, naphthyl, etc.; aralkyl radicals, e. g., benzyl, etc.; alkaryl radicals, e. g., tolyl, xylyl, etc.; and further members where R' and R" taken together form cyclo aliphatic radicals, and further members where R, R', R", R'" are substituted organic radicals. Thus, the nitrogen dioxide adds to the double bond to form the free radical compound of Equation 1, which, in turn, reacts with the nitrosyl chloride to form the chloro-nitro compound and nitric oxide of Equation 2. The oxygen then reacts with the nitrous oxide as in Equation 3 to regenerate the nitrogen dioxide. Where there is a difference in the degree of substitution of the two olefinic carbon atoms, the $NO_2$ of Equation 1 will add to the least substituted carbon.

This invention is applicable to any hydrocarbon or substituted hydrocarbon compound containing at least one olefinic double bond. Examples of such olefinic compounds are, for example, straight chain alkenes, e. g., propene, butene-1, butene-2, pentene-1, hexene-1, etc.; branched-chain alkenes, e. g., 2-methylpropene-1, 2-methylbutene-1, 4-methylhexene-2, di-iso-butylene etc.; dialkenes, e. g., butadiene-1,3, 2,3-dimethylbutadiene-1,3, etc.; cycloalkenes, e. g., cyclohexene, α-pinene, etc.; aralkenes, e. g., stryene, α-methyl styrene, p-chlorostyrene, etc.

Compounds which may be prepared in accordance with the practice of my invention include, for example, 1-nitro-2-chloropropane, 1-nitro-2-chlorobutane, 2-nitro-3-chlorobutane, 1-nitro-2-chloropentane, 1-nitro-2-chlorohexane, 1-nitro-2-chloro-2-methylpropane, 1-nitro-2-chloro-2-methylbutane, 2-nitro-3-chloro-4-methylhexane, 2-chloro-3-nitro-2,5-dimethylhexane, 1,4-dinitro-2,3-dichlorobutane, 1,4-dinitro-2,3-dichloro-2,3-dimethylbutane, 1-nitro-2-chlorocyclohexane, α-chloro-β-nitrostyrene, α-chloro-β-nitro-α-methylstyrene, α-chloro-β-nitro-p-chlorostyrene, etc.

My chloronitration reaction may be carried out under a wide range of pressures and temperatures. Preferably, the reaction is carried out at atmospheric pressure to allow the use of relatively inexpensive equipment instead of expansive high pressure equipment. However, if desired, the reaction may be carried out at superatmospheric pressures, such as pressures up to 5 to 10 atmospheres. When the reaction is carried out at atmospheric pressure, the temperature is preferably maintained below the boiling point of nitrosyl chloride ($-5.5°$ C.) to reduce the loss of nitrosyl chloride in the form of vapor. Suitable temperature ranges have been found to be from about $-30°$ C. to about $-5°$ C., and preferably about $-10°$ C.

In carrying out my invention, nitrosyl chloride and the oxides of nitrogen other than nitrous oxide are dissolved in an ether or ester solvent. Suitable solvents are, for example, dimethyl ether, diethyl ether, methyl ethyl ether, di-isopropyl ether, tetrahydrofuran, ethyl isopropyl ether, methyl acetate, ethyl acetate, ethyl butyrate, etc. When the olefinic compound undergoing reaction is a liquid or a solid at the reaction temperature, the olefin is also dissolved in the solvent and oxygen is bubbled through the system to effect the reaction. Where the olefin is a vapor at the reaction temperature, both the oxygen and the olefin are advantageously bubbled through the dissolved nitrosyl chloride and oxide of nitrogen.

The amount of solvent used is not critical and may very within wide limits as long as there is enough solvent to hold the reactants and products in solution. Since one mole of nitrosyl chloride reacts for one mole of olefin compound, the ratio of nitrosyl chloride to each olefinic double bond should be at least 1, and preferably, from 1 to 2. Although stoichiometry requires only one-half mole of oxygen for each mole of olefin, I prefer to use an excess of oxygen to give a molar ratio of oxygen to olefin up to about 3 and preferably about 2. Because nitrogen dioxide is regenerated by the oxidation of nitric oxide during the reaction, only catalytic quantities of the oxide of nitrogen are required to sustain the reaction. Since an increase in the concentration of the oxide of nitrogen increases the rate of reaction, the amount of the oxide of nitrogen used as catalyst is dependent upon the economics involved. Suitable catalytic amounts of the oxide of nitrogen may vary from a mere trace up to about 50 mole percent of the oxide based on the amount of olefin being reacted. Preferably, the ratio of the oxide of nitrogen to the olefin is about 25 mole percent.

Where the chloro-nitration takes place at pressures above one atmosphere in sealed systems, the proportions of reactants remain the same as for the reaction at atmospheric pressure. However, at elevated pressures, the temperature range may vary within wider limits than in the previous case. Under super-atmospheric pressures the temperature may vary from about $-20°$ C. to about $40°$ C. and preferably the temperature is about room temperature, i. e., about 20 to 25° C.

The following examples are included as illustrations of the practice of my invention and are not intended for purposes of limitation.

*Example I*

350 ml. of ether, 74 grams (1.13 moles) of nitrosyl chloride, and 25 grams (0.27 moles) of dinitrogen tetroxide were placed in a 3-neck flask equipped with a gas inlet tube, thermometer, Dry-Ice reflux condenser, and stirrer. The flask was cooled to $-6$ to $-8°$ C. and kept at this temperature for 71 minutes while 350 ml. per minute of butene-1 and 700 ml. per minute of oxygen gas were mixed and passed through the mixture of the flask. The total amount of butene-1 passed into the flask was 1 mole, while the total amount of oxygen passed into the flask was 2 moles. After the gases had passed through the flask, the flask was allowed to stand for one hour with the temperature gradually rising to about 10° C. The flask was evacuated to distill the excess nitrosyl chloride, dinitrogen tetroxide, and 170 ml. of ether into a Dry-Ice cooled trap. 0.46 mole of nitrosyl chloride was recovered in this way; however, it is not known how much nitrosyl chloride was carried through the reflux condenser by oxygen during the run and thus lost. The residual ether solution contained about 77 grams of reaction products including some material which crystallized out on standing. After some water-soluble products had been extracted with water, the residual liquid products were fractionated by a series of distillations. These distillations yielded 38 grams of 1-nitro-2-chlorobutane which boiled at about 68° to 75° C. under 9 mm. pressure and had a refractive index $n_D^{20}$ 1.449. This colorless liquid product had a musty odor like that of phosgene and contained 24.0 percent of chlorine replaceable by alcoholic sodium hydroxide. (Theoretical chlorine: 25.8 percent.) An infra-red spectrum showed that the only functional group present in appreciable amounts was the unconjugated nitro group. Redistillation of the 68–75° C. fraction yield 1-nitro-2-chlorobutane boiling at 76° C. at 10 mm. and having a refractive index $n_D^{20}$ 1.4487.

*Example II*

350 ml. of ether, 78 grams (1.19 moles) of nitrosyl chloride and 21 grams (0.23 moles) of dinitrogen tetroxide were placed into a 3-neck flask equipped with a gas inlet tube, thermometer, Dry-Ice reflux condenser, and a stirrer. The flask and its contents was cooled in an ice-salt bath to about $-10°$ C. and maintained at that temperature for 71 minutes while 350 ml. per minute of butene-1 gas and 350 ml. per minute of oxygen were mixed and bubbled into the flask. The amount of both butene-1 and oxygen bubbled into the flask during the 71 minute period was 1 mole. After this 71 minute period, 350 ml. per minute of oxygen alone were bubbled into the flask for the next 3 hours while maintaining the flask and its contents at about $-10°$ C. Oxygen was then bubbled into the flask at the same rate for the next 45 minutes while the flask and its contents warmed up to about zero degrees centigrade. The solution in the flask was then treated as in Example I and yielded 42 grams of 1-nitro-2-chloro butane having a boiling point between 68 and 75° C. at 9 mm. and having a refractive index $n_D^{20}$ 1.449.

*Example III*

In Examples I and II the reaction was carried out in the presence of a nitrogen dioxide producing catalyst. In this example the effect of leaving out the catalyst is shown. 350 ml. of ether, 78 grams (1.19 moles) of nitrosyl chloride were placed in a 3-neck flask equipped with a gas inlet tube, thermometer, Dry-Ice reflux condenser, and stirrer. 350 ml. per minute of 1-butene gas and 350 ml. per minute of oxygen were mixed and passed into the flask for 71 minutes while maintaining the flask at about $-5$ to $-10°$ C. After this 71 minute period the flask and its contents were allowed to warm up to about $+5°$ C. in 15 minutes and remained at this temperature for an additional 45 minutes. The solution in the flask was treated as in Example I and yielded only 6 grams of 1-nitro-2-chloro-butane having a boiling point of 68 to 79° C. under 10 mm. and having a refractive index of $n_D^{20}$ 1.449. This example shows that in the absence of the nitrogen dioxide supplying catalyst the formation of the nitrochlorobutane is almost negligible as compared to those cases in which the catalyst is used.

*Example IV*

1-nitro-2-chlorobutane may be prepared at superatmospheric pressures by placing 1 mol of butene-1, 2 mols of oxygen, about 1.13 mols of nitrosyl chloride and about 0.27 mols of dinitrogen tetroxide in a sealed vessel at about 5 atmospheres pressure and allowing the reaction to take place at about 25° C. for an hour. At the end of this time the pressure on the reaction vessel may be released and the reaction products filtered, water extracted, and distilled as in Example I to recover the 1-nitro-2-chlorobutane.

*Example V*

1-nitro-2-chloro-2-methylbutane may be prepared by dissolving 1 mol of isobutylene, 1 mol of nitrosyl chloride, and about 0.25 mols of dinitrogen tetroxide in ether and maintaining the solution at a temperature of about $-5°$ C. while bubbling oxygen through the solution. After the reaction has taken place, the solution may be water extracted to remove any water-soluble products and distilled to recover the 1-nitro-2-chloro-2-methylbutane.

Choloro-nitro compounds prepared in accordance with the practice of my invention are desirable chemical intermediates because of their high reactivity and convertability to nitro-olefins by the dehydrochlorination. These compounds are of value per se, as economic poisons such as bacetericides, fungicides, insecticides, and as fish repellents.

What I claim as new and desire to secure by Letters Patent of the United States is:

1. The method of making substituted lower aliphatic hydrocarbon compounds having a chlorine atom attached to one carbon atom and a nitro group attached to the adjacent carbon atom, which method comprises bubbling oxygen through a solution of (1) a lower aliphatic hydrocarbon containing at least one olefinic double bond, (2) nitrosyl chloride, and (3) an oxide of nitrogen other than nitrous oxide.

2. The method of making 1-nitro-2-chlorobutane which comprises bubbling oxygen and butene-1 through a solution of nitrosyl chloride and an oxide of nitrogen other than nitrous oxide.

3. The method of claim 2 in which the oxide of nitrogen is dinitrogen tetroxide.

4. The method of making substituted lower aliphatic hydrocarbon compounds having a chlorine atom attached to one carbon atom and a nitro group attached to the adjacent carbon atom, which method comprises bubbling oxygen and a lower aliphatic hydrocarbon containing at least one olefinic double bond through a solution of nitrosyl chloride and dinitrogen tetroxide.

5. The method of making substituted lower aliphatic hydrocarbon compounds having a chlorine atom attached to one carbon atom and a nitro group attached to the adjacent carbon atom, which comprises bubbling oxygen through a solution comprising a solvent selected from the class consisting of esters and ethers, nitrosyl chloride, a lower aliphatic hydrocarbon containing at least one olefinic double bond and dinitrogen tetroxide.

6. The method of making substituted lower aliphatic hydrocarbon compounds having a chlorine atom attached to one carbon atom and a nitro group attached to the adjacent carbon atom, which method comprises bubbling oxygen through a solution of (1) a lower aliphatic hydrocarbon containing at least one olefinic double bond, (2) nitrosyl chloride, and (3) an oxide of nitrogen other than nitrous oxide, said solution being maintained at a temperature of from −30° C. to 40° C. and at a pressure of from 1 to 10 atmospheres.

7. The method of making 1-nitro-2-chlorobutane which comprises bubbling oxygen and butene-1 through a solution of nitrosyl chloride and dinitrogen tetroxide, said solution being maintained at atmospheric pressure and a temperature of about −10° C.

8. The method of making a compound having the formula

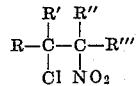

which method comprises bubbling oxygen through a solution of (1) an olefinically unsaturated compound having the formula

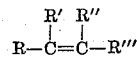

(2) nitrosyl chloride, and (3) an oxide of nitrogen other than nitrous oxide, where R, R′, R″ and R‴ represent members selected from the class consisting of hydrogen, saturated lower aliphatic hydrocarbon radicals, olefinically unsaturated lower aliphatic hydrocarbon radicals, aralkyl radicals, aryl radicals, alkaryl radicals, and further members where R′ and R″ taken together form cycloaliphatic radicals.

References Cited in the file of this patent
UNITED STATES PATENTS

| | | |
|---|---|---|
| 2,370,518 | Beekhuis | Feb. 27, 1945 |
| 2,511,915 | Himel | June 20, 1950 |
| 2,512,587 | Stengel | June 20, 1950 |
| 2,597,698 | Bachman et al. | May 20, 1952 |